United States Patent [19]
Schmidt

[11] Patent Number: 5,456,513
[45] Date of Patent: Oct. 10, 1995

[54] SOUND AND WATER BARRIER AND METHOD OF MAKING THE SAME

[76] Inventor: Glen D. Schmidt, 30845 23 Mile Rd., New Baltimore, Mich. 48316

[21] Appl. No.: 124,157

[22] Filed: Sep. 20, 1993

[51] Int. Cl.⁶ .................................................. E04B 1/82
[52] U.S. Cl. ..................... 296/39.1; 296/146.7; 181/290
[58] Field of Search ........................ 296/39.1, 39.3, 296/146.7; 181/290, 291, 294

[56] References Cited

U.S. PATENT DOCUMENTS

| | | | |
|---|---|---|---|
| 4,045,076 | 8/1977 | Day, Sr. et al. | 296/39.3 |
| 4,588,627 | 5/1986 | Isaksen et al. | |
| 4,655,496 | 4/1987 | Gahlau et al. | 296/39.3 |
| 4,724,186 | 2/1988 | Kelch. | |
| 4,798,130 | 1/1989 | Dixon. | |
| 4,803,105 | 2/1989 | Kretow et al. | |
| 4,848,829 | 7/1989 | Kidd. | |
| 4,873,132 | 10/1989 | Jones et al. | |
| 4,886,696 | 12/1989 | Bainbridge. | |
| 4,932,315 | 6/1990 | Dixon. | |
| 4,945,682 | 8/1990 | Altman et al. | |
| 4,957,803 | 9/1990 | Foley. | |
| 4,965,113 | 10/1990 | Jones et al. | |
| 5,040,334 | 8/1991 | Dossin et al. | |
| 5,040,335 | 8/1991 | Grimes. | |
| 5,090,762 | 2/1992 | Krieger. | |
| 5,094,318 | 3/1992 | Maeda et al. | 296/39.3 X |
| 5,167,995 | 12/1992 | Johnson et al. | |
| 5,178,946 | 1/1993 | Sato et al. | |
| 5,297,842 | 3/1994 | Hayashi | 296/146.7 |
| 5,345,720 | 9/1994 | Illbruck et al. | 296/39.3 X |

FOREIGN PATENT DOCUMENTS

| | | | |
|---|---|---|---|
| 2409669 | 7/1979 | France | 296/39.1 |
| 3047418 | 7/1982 | Germany | 296/39.1 |
| 3200627 | 8/1983 | Germany | 296/39.3 |
| 3600745 | 7/1986 | Germany | 296/39.1 |
| 3715493 | 12/1988 | Germany | 396/39.1 |

*Primary Examiner*—Joseph D. Pape
*Attorney, Agent, or Firm*—Brooks & Kushman

[57] ABSTRACT

A sound and water and dust barrier (20) for a vehicle and method for making the same are disclosed. The water barrier (20) includes a laminated body (24) having a central layer (34) made of a filled plastic which provides sound dampening characteristics to the water barrier (20), and preferably two outer layers (36,38) of unfilled plastic sandwiching about the central layer (34). Ideally, the body (24) has a vacuum formed speaker recess (44) or contoured shape formed therein. Also, flexible clip pockets (50) may be sealingly attached about openings (70) in the body (24) to allow the water barrier (20) to be clipped to inner and outer door panels (25, 22) of a vehicle door (23). Further, an adhesive (30) and a release agent (32) may be applied on the opposing outer layers (36, 38). Preferably, the central and outer layers (34, 36, 38) are coextruded together.

19 Claims, 5 Drawing Sheets

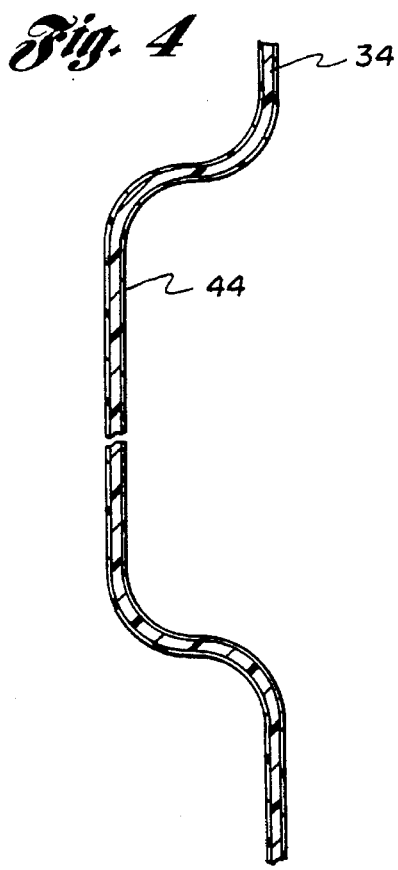
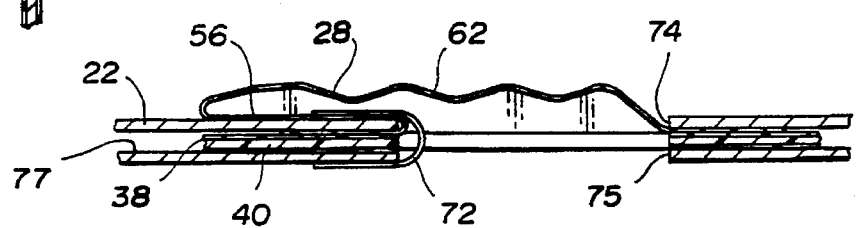
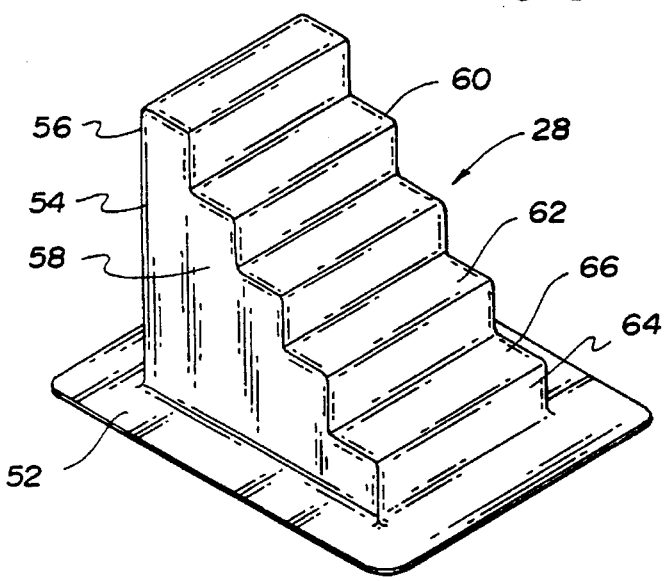

SOUND AND WATER BARRIER AND METHOD OF MAKING THE SAME

FIELD OF INVENTION

The present invention relates to water barriers which prevent moisture and dust from passing between vehicle body components.

BACKGROUND ART

Moisture impervious water barriers are used between vehicle bodies and vehicle inner panels to prevent moisture and dust from passing therebetween. One particular location in which water barriers are often used is between the inner and outer door panels of a vehicle door.

The vehicle inner panels often contain moisture absorbing materials, such as cloth or fiberboard, which can be damaged by absorbing water. Electrical circuitry located in cavities between the panels can also be harmed by moisture. Further, it is desirable to prevent dust from reaching the passenger compartment of the vehicle.

Conventionally, a couple of different types of water barriers have been used including plastic barriers and paper barriers covered with water repellant coatings. Adhesives typically are applied to these water barriers so that they may be adhesively secured to a vehicle door. Examples of plastic sheet water barriers are included in U.S. Pat. Nos. 4,957,803, 4,588,627, 4,932,315, 4,798,130, and 4,873,132.

Noise, vibration and harshness (NVH) materials may also be located between vehicle components or panels to reduce the transmission of noise from outside the vehicle into the passenger compartment. Barriers made of these NVH materials often made of pressed fiberboard or else a fibrous lint-like sheet of material. These sound barriers may absorb water which adversely affects their structural integrity and sound dampening capability.

Utilizing separate sound and water barriers increases the cost and complexity of manufacturing and repairing vehicles. Accordingly, there is a need for a water barrier which can be economically made and which efficiently inhibits both the transmission of sound and moisture between vehicle body components.

SUMMARY OF THE INVENTION

The present invention is directed to a sound and water barrier for a vehicle door and a method for making the same that satisfies the need for a unitary sound and water barrier.

The barrier comprises a body including a layer of plastic filled with a filler having sound dampening characteristics to thereby provide the body with sound dampening capability. Attachment means are added to the barrier for attaching the body to the vehicle door. The barrier inhibits water, dust and sound from reaching the inner door panel when the barrier is attached to the outer door panel.

The layer of filled plastic is preferably comprised of a filled thermoplastic ethylene polymer such as ethyl vinyl acetate. In one preferred embodiment, the layer of filled plastic may be surrounded by coextruded unfilled layers of plastic to enhance the vacuum formability of the body. A vacuum formed recess may be formed in the body to accommodate vehicle components when the barrier is mounted to the vehicle door covering the outer door panel.

The body may further include an aperture with a clip pocket sealingly attached to the body surrounding the aperture. The pocket is sufficiently elongate and flexible so that it maybe clipped against the body. Consequently, the barrier may be clipped to the inner and outer panels of the vehicle door. Alternatively, an elongated flexible clip pocket may be vacuum formed into the body.

A method for making a sound and water barrier for covering an outer door panel in a vehicle door to inhibit water, dust or sound from passing to an inner door is also disclosed. The method comprises the steps of forming a body, which includes a layer of plastic filled with a filler having sound dampening characteristics to thereby provide the body with a sound dampening capability, and providing the body with attachment means for attaching the body to the vehicle door. Therefore, the barrier made by this method inhibits both moisture and sound from passing therethrough to reach the inner door panel when the barrier is attached to the vehicle door.

Further steps in the method may include mixing fillers with a plastic to make the filled plastic and extruding the filled plastic to form the layer of filled plastic used in the body. The extruding step may further comprise the step of coextruding one or two unfilled layers of plastic onto the filled layer of plastic.

Also, a step of vacuum forming a recess into the body may be included so that the barrier can accommodate vehicle components when the barrier is attached to the vehicle's inner door panel. Vacuum forming steps may further include integrally forming flexible clip pockets into the body.

Further, the step of forming the body may include cutting the body to a predetermined shape with an aperture also being cut in the body. Then a clip pocket may be sealingly attached to the body about the aperture. The clip pocket should be sufficiently elongate and flexible so that it may be clipped against the body.

It is an object of the present invention to provide a barrier which not only inhibits water and dust from passing between vehicle components but also inhibits sound transmission.

It is a further object of the present invention to provide a body of a barrier which provides sound dampening and which is vacuum formable to a particular shape to accommodate vehicle components located adjacent the barrier when the barrier is mounted to a vehicle door.

It is yet a further object to provide a barrier having a flexible and elongate clip pocket which allows the clip pocket to be clipped against the body and to either or both inner and outer door panels to mount the barrier to a vehicle door.

Another object is to provide a sound, water and dust barrier comprising a laminated body made of two outer layers of thermoplastic surrounding a central layer of thermoplastic material filled with a sound dampening mineral. This combination provides a sound insulating water barrier which is also vacuum formable. The outer layers provide structural support to the central layer which otherwise might tear or rupture during vacuum forming.

BRIEF DESCRIPTION OF THE DRAWINGS

These and other features, objects, and advantages of the present invention will become readily apparent from the following description, pending claims, and accompanying sheets of drawings where:

FIG. 4 is an enlarged fragmentary sectional view, taken along line 4—4 of FIG. 2, showing a vacuum formed recess in the body of the barrier which accommodates vehicle components when the barrier is mounted to the vehicle door;

FIG. 5a is an enlarged fragmentary sectional view, taken along line 5—5 of FIG. 2, showing a clip pocket in a projected position;

FIG. 5b shows the clip pocket of FIG. 5a in a collapsed position being clipped to receiving apertures in vehicle inner and outer door panels;

FIG. 6 is an enlarged perspective view of the clip pocket prior to being attached to the body of the barrier;

BEST MODE FOR CARRYING OUT THE INVENTION

Figure 1:
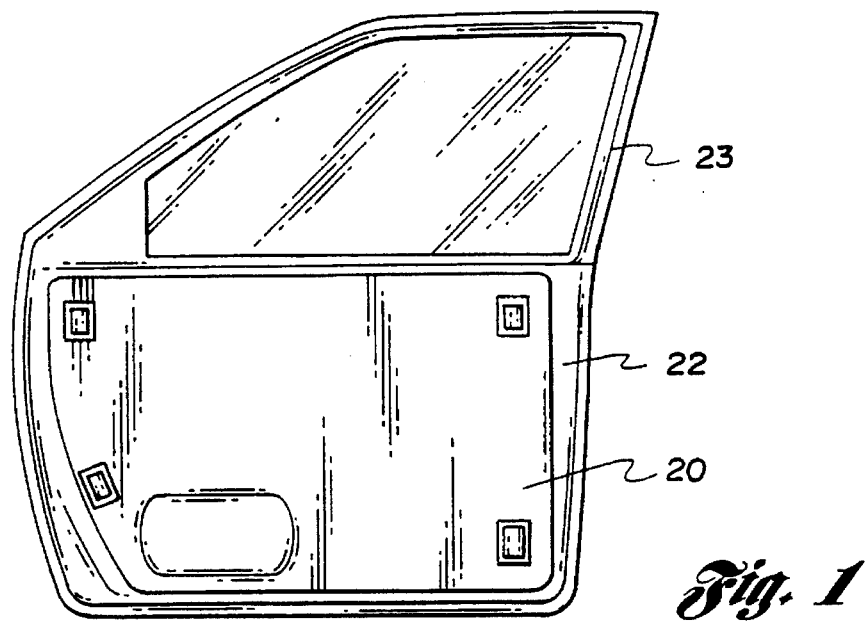
FIG. 1 is an elevational view of a barrier, made in accordance with the preferred embodiment of the present invention, attached to an outer panel of a vehicle door.
Figure 2:
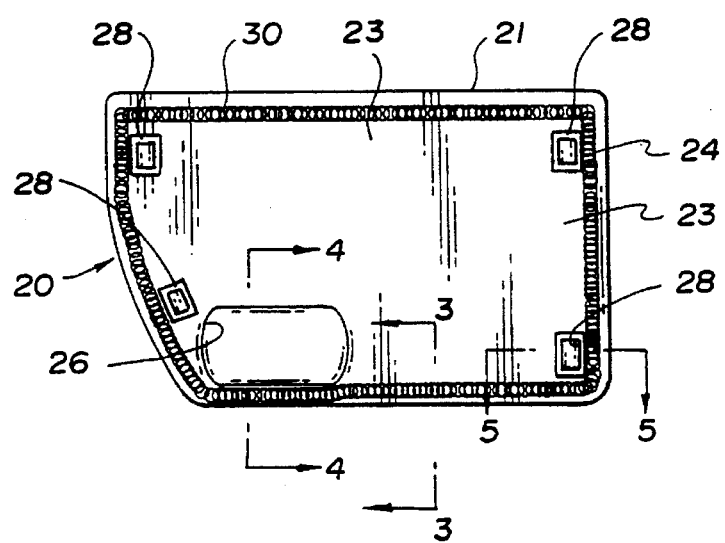
FIG. 2 is an elevational view of the water barrier utilized in FIG. 1.

FIG. 1 shows a sound and water barrier 20, made in accordance with the preferred embodiment of the present invention, which is adhesively secured to an outer door panel 22 of a vehicle door 23. Barrier 20, as best seen in FIG. 2, includes a coextruded body 24 having a vacuum formed recess 26 formed therein to accommodate a portion of a loud speaker, four clip pockets 28 sealingly secured to body 24, and a ribbon of adhesive 30 which extends along the periphery of body 24. Adhesive 30 is located on a back surface 21 of water barrier 20 and a release agent 32 is coated on a front surface 27. Back surface 21 adhesively secures to outer door panel 22 when barrier 20 is pressed against outer door panel 22.

Figure 3:
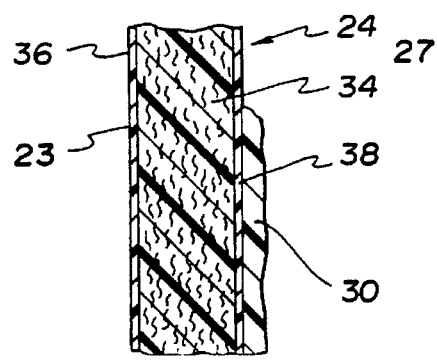
FIG. 3 is an enlarged fragmentary sectional view, taken along line 3—3 of FIG. 1, illustrating that the body of the barrier, in the preferred embodiment, is a coextruded three layer laminate.

Looking now to FIG. 3, extruded body 24, in the preferred embodiment, includes a central layer 34 sandwiched between outer layers 36 and 38. Central layer 34 is preferably an ethyl vinyl acetate (EVA) thermoplastic filled with ground minerals which provide barrier 20 with sound dampening or insulation characteristics. Otherwise, unfilled EVA or other similar plastics provide little sound insulation. The filler is preferably a ground mineral such as mica, limestone or gypsum. However, other substances which provide sound dampening qualities may also be used. The fillers and plastics used are chosen to ideally produce a material that can be vacuum formed but can still withstand temperatures on the order of 180° F. for a short period of time. Outer layers 36 and 38 are preferably thin layers made of unfilled EVA. Plastics which may be used in place of the EVA include polyethylene, polyvinyl chloride or other formable plastics.

Table 1 summarizes filled plastic resins, and some of their selected physical properties, which have been tested for use in making central layer 34. These resins are commercially available from Du Pont Polymers of Troy, Mich. under the tradename Keldax®. Similar materials are available from the Blachford Corporation, also of Troy, Mich. The preferred resin for use in making central layer 34 is the resin designated as 15-2 from Table 1. The 6868 resin is a standard commercial resin but exhibits lower tear strength and melt point than does the 15-2 resin.

TABLE 1

| Resin | 6868 | 15-1 | 15-2 | 15-4 |
| --- | --- | --- | --- | --- |
| Melt Index | 2.5 | 5 | 5.6 | 4.5 |
| Tensile Elong. (%) | 510 | 315 | 435 | 400 |
| Specific Gravity | 2.13 | 1.84 | 1.72 | 1.91 |
| Tear Strength (lb in/in) | 135 | 205 | 216 | 190 |
| DSC Melt Point, °F. | 167 | 200 | 192 | 199 |

The purpose of extruding outer layers 36 and to central layer 34 is to increase the vacuum formability of body 24. When the resin of central layer is filled with the sound absorbing filler or mineral, the vacuum formability of the central layer 34, without cracking or tearing, is reduced. Hence, the addition of the reinforcing outer layers 36 and 38. If no or only small recesses 26 are to be vacuum formed into body 24, barrier 20 may be comprised only of the single central layer 34. For additional strength, one of layers 36 or may be added to central layer 34 to accommodate slightly larger recesses. Finally, for large or extreme vacuum formed recesses, both layers 36 and 38 should be extruded onto central layer 34.

The following description will pertain to the three-layered barrier 20 as depicted in FIG. 3. However, as just described, the present invention also includes barriers having just the central layer 34 of filled plastic. In this preferred embodiment, body 24 has a nominal thickness of 0.026–0.029 inches. Central layer 34 is preferably 0.020 inches thick and outer layers 36 and 38 are each 0.003 inches thick. The thickness and specific gravity of central layer 34 and outer layers 36 and 38 may be varied to produce desired acoustic qualities.

FIG. 4 shows recess 26 which is vacuum formed into body 24 of water barrier 22. This recess 26 accommodates a loudspeaker (not shown) located within vehicle door 23. Other recesses can likewise be shaped into body 24 as needed to accommodate other vehicle components attached to vehicle door 23.

FIGS. 5a and 5b show one of the clip pockets 28 which are sealingly secured to outer layer 38 of laminated body 24. Thermowelding is preferably used to attach each clip pocket 28 to body 24. However, other attachment means may also be used such as employing adhesives. Clip pockets 28 are approximately 0.003–0.005 inches thick in the preferred embodiment and are made of unfilled plastic like outer layers 36 and 38. A separate vacuum forming operation is ideally used to form clip pockets 28.

FIG. 6 shows a clip pocket 28 prior to attachment to laminated body 24. Clip pocket 28 includes a flat planar base 52 and a pocket portion 54. Pocket portion 54 includes a back wall 56, a pair of opposing side walls 58 and 60 and a front wall 62. Front wall 62 is ideally arranged in a series of steps having generally perpendicular adjacent planar vertical and horizontal surfaces 64 and 66. As clip pocket 28 is preferably vacuum formed, the stepped arrangement of front wall 62 is well suited to the vacuum forming process.

Referring back to FIGS. 5a and 5b, one of the four apertures 70 located in laminated body 24 is shown surrounded by and sealingly covered by base 52 of clip pocket 28. Consequently, no moisture or dust can pass through aperture 70.

In FIG. 5a, clip pocket 28 is shown in an upright, stepped position. In contrast, clip pocket 28 is shown in a collapsed position in FIG. 5b. In this position, back wall 56 overlies and is juxtaposed with outer layer 38 of laminated body 24 and is held in that position by a clip 72. Back wall 56 is allowed to achieve this overlying position by the unfolding or straightening of front wall 62. An aperture 74 is formed in outer door panel 22 to receive clip 72. Likewise, an aperture 75 is formed in an inner door panel 77 with clip 72 attaching barrier 20 to each of inner and outer panels 23 and 77. Inner door panel 77 may be supported by the four clips 72 attached to outer door panel 22.

Figure 7A:
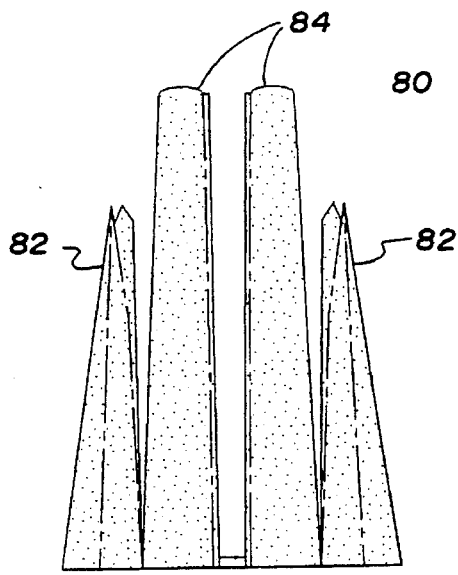
FIG. 7a–c shows respective front, top and side elevational views of an alternative embodiment of a pleated clip pocket which is ideally integrally vacuum formed into the body.
Figure 7B:
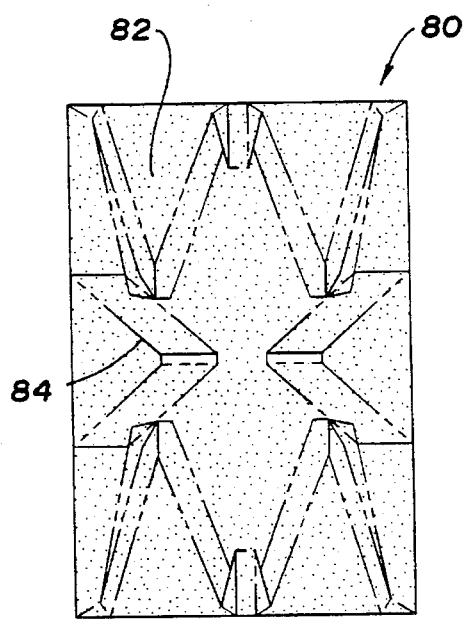
Figure 7C:
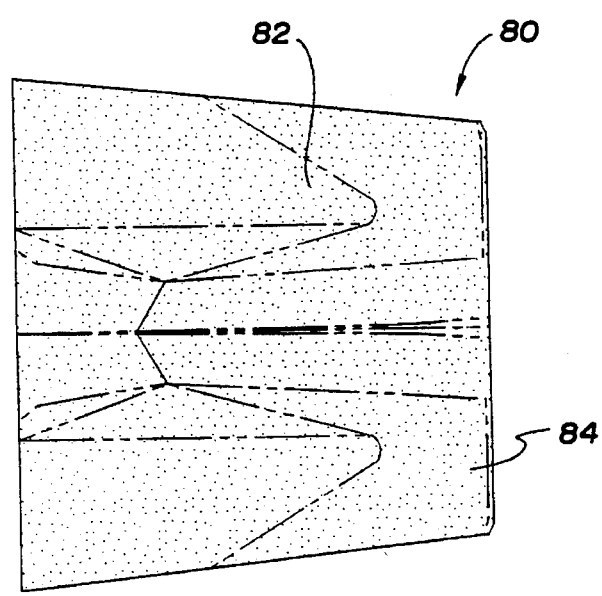
Figure 8A:
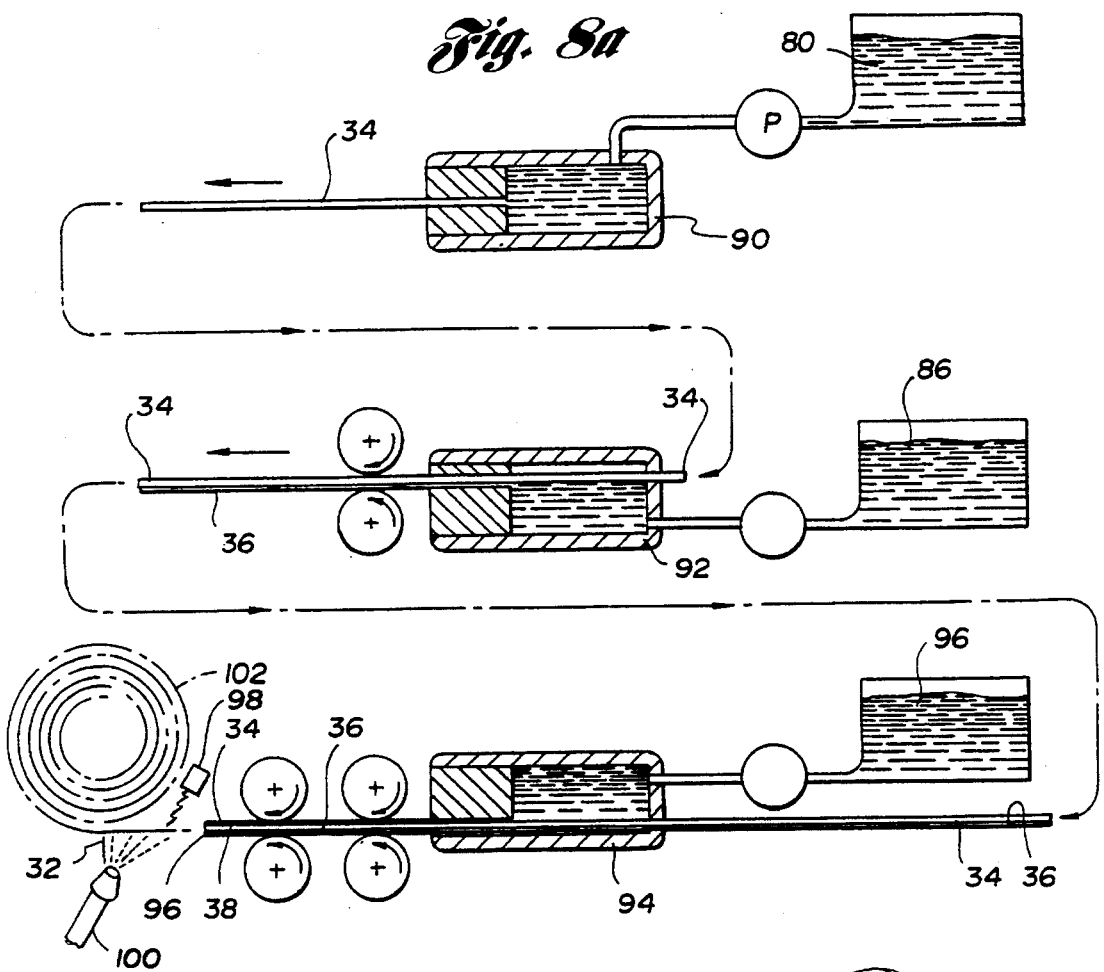
FIG. 8a is a schematic view of a laminated roll of material being coextruded including a central layer of filled plastic and two outer unfilled layers of plastic.
Figure 8B:
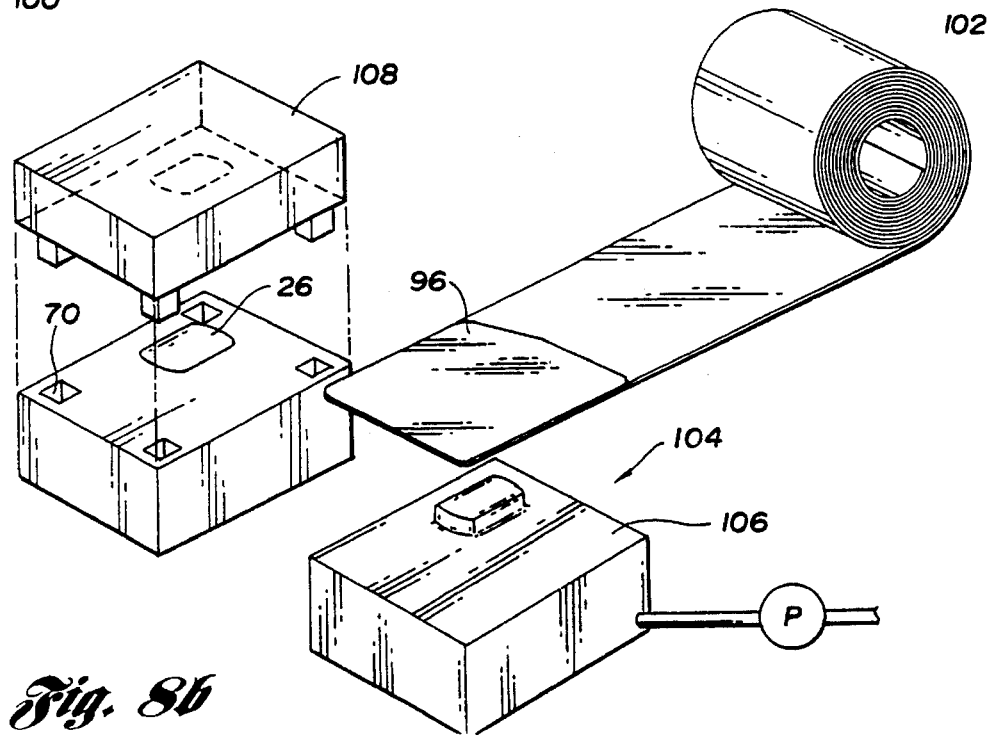
FIG. 8b is a schematic view of portions of the laminated roll being unrolled, vacuum formed, and then die cut.
Figure 8C:
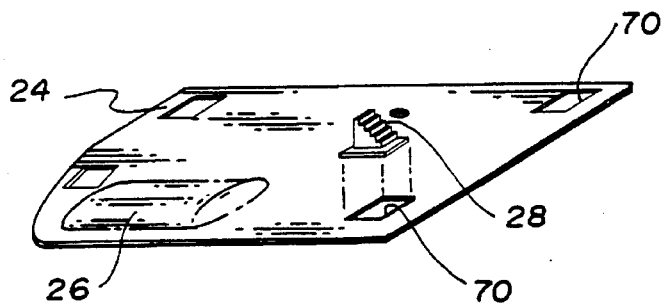
FIG. 8c is schematic view showing a clip pocket being attached about an aperture in the body.
Figure 8D:
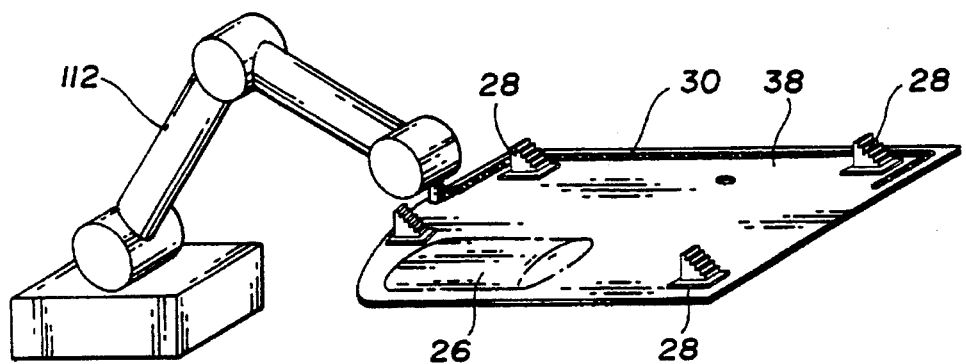
FIG. 8d is schematic view of a robot applying adhesive about the periphery of the body.
Figure 8E:
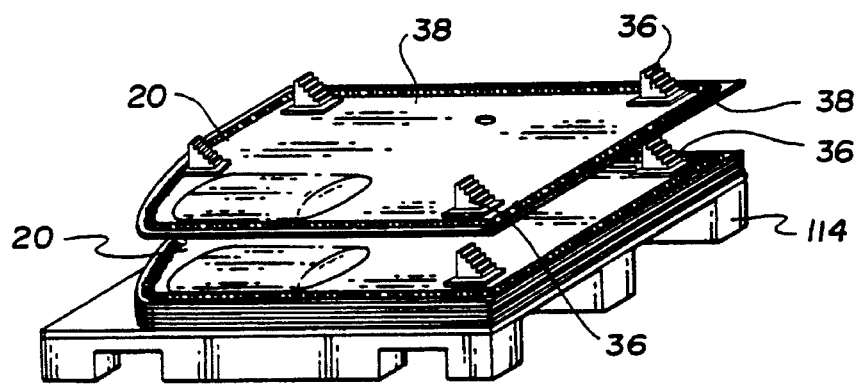
FIG. 8e shows a plurality of barriers being stacked one atop another for shipping.

FIGS. 7a–c show an alternative design for a clip pocket 80 have a plurality of shorter pleats 82 and adjacent longer pleats 84 centrally located between the shorter pleats 82. Again clip pockets 80 seal about apertures 70 and are capable of collapsing and being clipped against body 24 of barrier 20. The vertical pleats 82 and 84 allow the pocket to be stretched horizontally and reduce the tendency for puncture of clip pocket 80 by clip 72.

FIGS. 8a–e illustrate the steps taken in manufacturing barrier 20.

First, the Keldax® resin described above is made which includes filler such as ground mica. The filled plastic is then melted and extruded by an extruder 90 into central layer 34. Coextruded to central layer 34 by extruders 92 and 94 are unfilled layers 36 and 38 of plastic to form a laminate 96. It is important during the extrusion process to mark the extrusion direction. The extruded plastics will shrink during the vacuum forming process and will shrink more in the direction of extrusion than transverse thereto.

The surface of layer 38 of laminate 96 is corona or electrically treated by a corona treatment apparatus 98 to raise its surface energy level, preferably to a minimum of at least 38 dynes. The corona treatment prepares the laminate 96 to later receive adhesive 30. Layer 36 is treated by a spraying or rolling apparatus 100 with a release agent, preferably silicon. The treated laminate 96 is then rolled into a roll 102 for shipping and storage.

Next, a portion of laminate 96 is unrolled and recess 26 is vacuum formed therein using vacuum forming apparatus 104 having a mold face 106. Then, a die 108 is used to cut laminate 96 into the outline of body 24 and apertures 70 into body 24. This die cutting operation preferably occurs after the vacuum forming due to the difficulty of holding dimensions of body 24 during the heating process associated with vacuum forming.

Clip pockets 28 or 80, as shown in FIGS. 6 or 7, are then attached to body 24. Preferably, clip pockets 28 or 80 are thermowelded to body 24. Only local regions around apertures 70 are heated to minimize distortion due the heating. Alternatively, clip pockets 28 or 80 may be adhesively secured about apertures 70.

A robot 112 is used to apply a ribbon of adhesive 30 about the periphery of laminated body 24 on outer layer 38. The preferred technique is to form the adhesive with an inert gas, usually nitrogen. This technique enhances the adhesion of commercially available adhesives and reduces cost. The preferred ratio is 50% gas to 50% glue. The preferred adhesive is Bostic's Pressure Sensitive Hot Melt Adhesive 9065. Other suppliers which provide pressure sensitive adhesives include H. B. Fuller, Dexter Automotive Products and Theme Corporation's National Adhesive division.

Some material will lose surface energy during the vacuum forming process. For these materials, a corona treatment may be added to the process between the vacuum forming and the adhesive application processes.

A plurality of barriers 20 are then stacked one on top of another on a pallet 114 for further shipping and handling. Barriers 20 are easily separated from one another as release agent 32 prevents adhesive 30 from securing to an adjacent water barrier 20.

In the case where clip pockets 80 are vacuum formed into body 24, mold face 106 will be appropriately configured to form pleats 82 and 84. The die cutting step will then not include cutting apertures 70 into body 24 as pockets 80 are already integrally attached to body 24.

In mounting barrier 20 to vehicle door 23, barrier 20 is aligned with outer door panel 22 and pressed firmly thereon with adhesive 30 retaining water barrier 20 to outer panel 22. In the event barrier 20 is removed from door 23, adhesive 30 will remain adhered to body 24 and will release from door 23 due, in part, to the corona treatment of body 24. Accordingly, barrier 20 can be remounted to the vehicle door 23.

Further securement of barrier 20 to vehicle door 23 is provided by selectively positioning clip pockets 28 or 80 from their upright positions into their collapsed and extended positions. Clips 72 are then installed over pocket portions 28 or 80 and outer panel 22 and inner panel 77 thereby clamping water barrier 20 to vehicle door 23.

While the foregoing specification of this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principals of the invention.

What is claimed is:

1. A sound and water barrier for mounting between outer and inner door panels of a vehicle door to inhibit moisture from passing therebetween, the barrier comprising:

a laminated body including a first layer of plastic filled with a filler having sound dampening characteristics to thereby provide the layer with sound dampening capability and a second substantially unfilled layer of plastic laminated to the first layer; and attachment means for attaching the body to one of the vehicle door panels;

wherein the laminated body is thermally molded to a three-dimensional shape and the cooperation of the filler with the plastic in the first layer of plastic provides a barrier to inhibit both moisture and sound from passing from the outer door panel and through the inner door panel when the sound and water barrier is attached between said panels.

2. The barrier of claim 1 wherein:

the filled layer of plastic is comprised of a filled thermoplastic ethylene polymer.

3. The barrier of claim 1 wherein:

a second unfilled layer of plastic is laminated to the first filled layer of plastic.

4. The barrier of claim 1 wherein:

the body has a vacuum formed recess formed therein.

5. The barrier of claim 4 wherein:

the body includes an aperture with a clip pocket sealingly attached to the body surrounding the aperture, the pocket being sufficient elongate and flexible so that it may be clipped against the body.

6. The barrier of claim 1 wherein:

the body includes an aperture with a clip pocket sealingly attached to the body surrounding the aperture, the clip pocket being sufficiently elongate and flexible so that it may be clipped against the body.

7. The barrier of claim 1 wherein:

the body includes a first side and a second side, the first side having an adhesive thereon and the second side having a release agent.

8. The barrier of claim 1 wherein:

the filled layer of plastic has a specific gravity in range of 1.60–2.20.

9. The barrier of claim 8 wherein:

the filled layer of plastic has a specific gravity in the range of 1.69–1.75.

10. The barrier of claim 1 wherein:

the first layer is filled with at least one of a mica, limestone or gypsum material.

11. A method for making a sound and water barrier for a vehicle door to inhibit moisture from passing between an outer door panel and an inner door panel, the method comprising the steps of:

forming a laminated body including a first layer of plastic filled with a filler having sound dampening characteristics to thereby provide the layer with sound dampening capability and a second substantially unfilled layer of plastic laminated to the first layer;

thermally molding the laminated body into a three-dimensional shape; and;

providing the body with attachment means for attaching the body to the vehicle door;

wherein the second layer is sufficiently ductile to support the first layer without tearing during the thermally molding of the laminated body into the three-dimensional shape and the cooperation of the filler with the plastic in the first layer of plastic provides a barrier to inhibit both moisture and sound from passing from the outer door panel and through the inner door panel when the sound and water barrier is attached between said panels.

12. The method of claim 11 further comprising the steps of:

mixing fillers with a plastic to form the filled plastic; and extruding the filled plastic to form the filled layer of plastic used in the body.

13. The method of claim 12 wherein:

the step of extruding the filled layer of plastic includes coextruding the second unfilled layer of plastic onto the filled layer of plastic.

14. The method of claim 12 wherein:

the step of extruding the filled layer of plastic includes coextruding substantially unfilled layers of plastic onto both sides of the filled layer of plastic.

15. The method of claim 11 wherein the thermal forming includes:

vacuum forming a recess into the body so that the barrier can accommodate vehicle components when the barrier is attached to the vehicle door.

16. The method of claim 11 wherein:

the step of forming the body includes vacuum forming a clip pocket into the body, the clip pocket being sufficiently elongate and flexible so that the clip pocket may be clipped against the body.

17. The method of claim 11 wherein:

the step of providing the body with attachment means includes applying an adhesive on one side of the body so that the water barrier can be adhesively attached to the vehicle.

18. A sound and water barrier for a vehicle door to prevent water from passing between outer and inner door panels, the barrier comprising:

a body including a central layer of plastic filled with a filler having sound dampening characteristics to thereby provide the layer with sound dampening capability, and two outer layers of unfilled plastic sandwiching about the central layer, a vacuum formed recess formed in the body, and an aperture formed in the body;

an elongate flexible clip pocket sealingly attached to the body surrounding the aperture; and an adhesive secured to one of the outer layers for attaching the barrier to the vehicle and a release agent covering the other of the outer layers;

wherein the cooperation of the filler with the plastic in the plastic layer provides the barrier to inhibit both moisture and sound from passing from the outer door panel and through the inner door panel when the barrier is attached between said panels.

19. The method of claim 11 wherein:

the first layer is filled with at least one of a mica, limestone, or gypsum material.

* * * * *